United States Patent [19]
Griffin

[11] Patent Number: 5,447,789
[45] Date of Patent: Sep. 5, 1995

[54] ADHESION PROMOTER FOR PVC COMPOUNDS

[75] Inventor: Elizabeth R. Griffin, Newark, Del.

[73] Assignee: E. I. Du Pont de Nemours and Company, Wilmington, Del.

[21] Appl. No.: 129,869

[22] Filed: Sep. 30, 1993

[51] Int. Cl.$^6$ .............................................. B32B 5/18
[52] U.S. Cl. ................... 428/308.4; 525/123; 525/133; 525/144
[58] Field of Search ............... 525/144, 133, 123; 428/308.4

[56] References Cited

U.S. PATENT DOCUMENTS

| | | | |
|---|---|---|---|
| 2,378,667 | 4/1944 | Vaala | 260/43 |
| 3,780,140 | 12/1973 | Hammer | 260/884 |
| 4,489,193 | 12/1984 | Goswami | 525/190 |
| 4,988,753 | 1/1991 | Rullmann et al. | 524/260 |
| 5,168,009 | 12/1992 | Petrella et al. | 428/313.5 |

FOREIGN PATENT DOCUMENTS 52-17551  2/1977  Japan.

*Primary Examiner*—Melvyn I. Marquis
*Assistant Examiner*—D. Aylward
*Attorney, Agent, or Firm*—Craig H. Evans

[57] ABSTRACT

Promoting adhesion (without need for an adhesive) of polyurethane to polyvinyl chloride sheet plasticized with ethylene/carbon monoxide polymer by adding an effective amount of a phenolic resin; particularly novolac resins.

17 Claims, No Drawings

ADHESION PROMOTER FOR PVC COMPOUNDS

BACKGROUND OF INVENTION

1. Field of Invention

The present invention relates to a method of improving adhesion between flexible polyvinyl chloride sheet material and polyurethane foam.

2. Background Discussion and Related Art

The present invention relates to composite plastic moldings having a solid, thin skin of polyvinyl chloride (PVC) and a foamed backing layer and a process for their production. Such moldings are widely used in the manufacture of interior pans for motor vehicles, such as instrument panels, center consoles, arm rests or door inner panels. They also find utility in furniture, toys and a number of other applications well known in the art.

In the production of such composite plastic moldings, the solid PVC skin is generally produced in a known manner from a thermoplastic in a first step. This step is carried out in a suitable mold, for example by slush molding from a PVC-plasticizer plastisol or a PVC-powder-containing polymeric plasticizer.

In a second step, the solid skin produced in the first step is back-foamed with a suitable plastic either in the same mold (deep drawing) or after transfer to a second mold (slush molding). In automobile applications, the back-foaming can be done in place by injecting the suitable plastic between the flexible PVC skin and a rigid backing that the PVC covers. By virtue of their excellent foamability and the range of variation of the physical properties of the foam, polyurethane(urea) systems are generally used for this back-foaming step.

The polyurethane(urea) system, referred to hereafter as polyurethane (PU) foam, used for backing the PVC skin can be made from known processes and materials, such as polyisocyanates, polyols, catalyst and other additives (for example, blowing agents and cell stabilizers).

Suitable organic polyisocyanates include hexamethylene diisocyanate, phenylene diisocyanate, toluene diisocyanate and 4,4'-diphenylmethane diisocyanate. Especially suitable are mixtures of diisocyanates known commercially as "crude MDI", also known as PAPI, which contains about 60% of 4,4'-diphenylmethane diisocyanate along with other isomeric and analogous higher polyisocyanates. Also suitable are "prepolymers" of these polyisocyanates comprising a partially prereacted mixture of polyisocyanates and polyether or polyester polyols. Other suitable isocyanates are the 2,4- and 2,6-toluene diisocyanates ("TDI"), individually or together, in commercially available mixtures.

Illustrative of suitable polyols as a component of the PU foam are polyalkylene ether and polyester polyols. The polyalkylene ether polyols include the poly(alkylene oxide) polymers such as poly( ethylene oxide) and poly(propylene oxide) polymers and copolymers with terminal hydroxyl groups derived from polyhydric compounds including diols and triols. Examples include ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol and like low molecular weight polyols. Useful polyester polyols include those produced by reacting a dicarboxylic acid with an excess of a diol, for example, adipic acid with ethylene glycol or butane diol, or reacting a lactone with an excess of a diol such as caprolactone and propylene glycol.

Catalyst compositions typically used in the art include tertiary amines. The tertiary amines which may be protonated with the acid composition to form partial amine salts may be any of the tertiary amine compounds typically used as catalysts for the urethane reaction. Such tertiary amines are well known to those skilled in the art and would include, by way of example, pentamethyldiethyltriamine, trimethylaminoethyl ethanolamine, tetramethylamino-bis-propylamine, 2,6-diaza-2,6-dimethyl-10-hydroxydecane, N-ethyl morpholine, N,N'-dimethylpiperazine, N,N-dimethylaminopropylamine, triethylenediamine, N,N-dimethylaminoethoxyethanol, N,N-diethylaminoethoxyethanol, tetramethyl-2-hydroxypropyl diethyltriamine, dimethylaminoethanol, hydroxypropyl piperazine, bis-dimethylaminoethyl piperazine and N,2-hydroxypropyl morpholine.

Blowing agents include water, methylene chloride, trichlorofluoromethane and the like. Cell stabilizers include silicones.

The compounded PVC used in these applications can be externally or internally plasticized by methods well known in the art and can contain a wide selection of additives. Potential additives include (a) fillers and/or pigments (about 0% to about 20% by weight based on the PVC); (b) monomeric and polymeric process aids (about 2% to about 15% by weight); (c) lubricants (about 0.5% to about 3% by weight); (d) PVC stabilizers and antioxidants (about 3% to about 10% by weight); and (e) other functional additives (present in relatively minor amounts, typically under 2% by weight) including ultraviolet light stabilizers, drying agents, and the like.

Example components typically used in such compounded PVC include:

1. Resins such as acrylonitrile-butadiene-styrene copolymers, acrylic-rubber-modified styrene acrylonitrile copolymer and styrene-acrylonitrile polymer;
2. Liquid plasticizers such as diundecyl phthalate, tri-2-ethylenehexyl trimellitate, diisononyl phthalate, and polyesters;
3. Impact modifiers such as grafted particulate rubbery polymers such as methacrylate-butadiene-styrene (MBS), acrylate-methacrylate (all acrylic), acrylate-butadiene-methacrylate (modified acrylic), and acrylonitrile-butadiene-styrene (ABS); semicompatible plasticizing polymers such as chlorinated polyethylene (CPE) and ethylene-vinyl acetate (EVA); inorganics such as stearic acid-coated calcium carbonate; nitrile rubbers (NBR); and copolymers of vinyl chloride and insoluble rubber;
4. Fillers and pigments (to provide color, opacity, and aid in the calendering of the PVC) such as titanium dioxide, calcium carbonate, zinc oxide, white lead, gypsum, precipitated silica, carbon black, and red iron oxide;
5. Processing aids (to aid in the processing of the calenderable PVC and help in giving the final composite a favorable visual appearance) such as PVC/acrylate resin, acrylate processing aids, chlorinated polyethylene and alpha methyl styrene or acrylic polymers;
6. Lubricants such as stearic acid, oxidized polyethylene wax and other low molecular weight polymers; and 7. Stabilizers and antioxidants such as stearate salts, epoxidized vegetable oils, dibasic lead phosphite and dibutyl tin dilaurate, dimaleate or mercaptide.

In order to meet the rather stringent requirements regarding such combined characteristics as the pliability, strength and cold crack resistance needed in the product, the art has taught, in addition to the above, adding an effective amount of an ethylene/carbon monoxide terpolymer to the PVC compound. In particular, such properties as pliability, strength, low temperature flexibility or cold crack resistance, and color stability upon heat aging of the films are improved.

The ethylene/carbon monoxide polymer can be (as suggested in U.S. Pat. No. 3,780,140 to C. F. Hammer) used as an additive to conventional, noninternally-plasticized PVC and can be (as suggested in U.S. Pat. No. 4,489,193 to J. C. Goswami) used as an additive to internally-plasticized PVC. Both of these references are incorporated by reference. Useful ethylene/carbon monoxide polymers are copolymers of (a) from about 40% by weight (wt.%) to about 80 wt. % ethylene; (b) about 3 wt. % to about 30 wt. % carbon monoxide; and (c) from about 5 wt. % to about 60 wt. % of one or more termonomers copolymerizable therewith. Sulfur dioxide may be used in place of the carbon monoxide. Examples of suitable termonomers include the $C_3$-$C_{20}$ unsaturated mono- and di-carboxylic acids and their esters; the $C_1$-$C_{18}$ vinyl esters of saturated carboxylic acids; the vinyl $C_1$-$C_{18}$ alkyl ethers, acrylonitrile; methacrylonitrile; the $C_3$-$C_{12}$ alpha olefins, and ring compounds such as norbornene and vinyl aromatic compounds. A preferred polymer is of the form E/X/Y, having a melt index of 1.0 to 500 as measured using ASTM D-1238; wherein E is ethylene; X is a vinyl ether, vinyl acetate or an alkyl acrylate or methacrylate, the alkyl group having from 1 to 8 carbon atoms; and Y is carbon monoxide or sulfur dioxide, more preferably carbon monoxide. X preferably is 20–50 wt. %, more preferably 25–45 wt. % and most preferably 30–40 wt. % of the E/X/Y; and Y preferably is 5–40 wt. %, more preferably 7–25 wt. %, and most preferably 8–12 wt. % of the E/X/Y; with E being the remainder. Ethylene/vinyl acetate/carbon monoxide copolymer and ethylene/n-butyl acryl at e/carbon monoxide copolymer are preferred. The ethylene/carbon monoxide polymers of this type are commercially available under the trademark ELVALOY® from E. I. du Pont de Nemours and Company.

While addition of such ethylene/carbon monoxide polymers has improved the physical properties of the PVC skin, it has created a problem in producing the composite. In particular, when the PVC skin is back-foamed with the PU, the PU does not effectively adhere to the PVC. It has thus become necessary to apply an adhesive to the PVC prior to back-foaming with PU. This is a costly additional step. Also, if adhesion is not effective, the PVC skin can separate from the PU foam, particularly after aging at temperatures experienced in an automobile allowed to sit in the sun.

SUMMARY OF INVENTION

It has now been found that by adding an effective amount of a phenolic resin to the PVC-ethylene/carbon monoxide polymer blend that the PU foam will effectively adhere to the PVC without the need of an adhesive. Preferred phenolic resins are polymers of phenol or substituted phenol with aldehydes such as formaldehyde. Preferably, an effective amount of the phenolic resin is about 2 to about 50 parts per hundred parts (by weight) of PVC in the compounded PVC, more preferably about 5 to about 25 parts, and still more preferably about 5 to about 15 parts.

Order of addition does not appear to matter. That is, the resin may be added to the ethylene/carbon monoxide copolymer which in turn is added to the PVC composition. It may also be added directly to the PVC composition or the three components may be added concurrently.

DETAILED DESCRIPTION OF INVENTION

The present invention is an improved flexible PVC compound plasticized with an ethylene/carbon monoxide copolymer, the improvement comprising the presence of an effective amount of a phenolic resin in the PVC-ethylene/carbon monoxide copolymer blend.

The phenolic resins of the present invention, which may be thermosetting or thermoplastic poly-phenolic resins, are phenol-aldehyde resins generally referred to as "novolacs".

The thermoplastic resins are produced when a less than stoichiometfic amount of formaldehyde is reacted with phenol in an acidic solution. In general, novolacs contain no hydroxymethyl groups and cannot crosslink simply by heating as in the case of resoles.

The thermoset resins are those that crosslink to form cured, crosslinked-structures. Crosslinking is brought about by adding additional formaldehyde or, more commonly, by adding paraformaldehyde or hexamethylenetetramine.

The most preferred novolacs are those without additional crosslinking additives, that is the thermoplastic polyphenols.

Novolac resins useful in the present invention can be approximately represented by the general polymer formula:

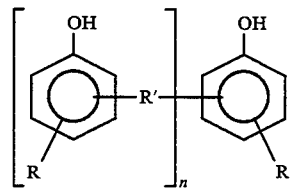

Wherein n can be an integer from 1 to 1000 and R can be hydrogen; a halogen (e.g. bromine, chlorine, fluorine, etc.); a $C_1$-$C_{16}$ alkyl group, a $C_6$-$C_{18}$ aryl group, or a $C_7$-$C_{20}$ arylalkyl radical, any of which may be substituted with a $C_1$-$C_{12}$ alkyl group or a halogen atom; or a hydroxy aryl or alkyl hydroxy aryl radical.

And, wherein R' can be $CH_2$ (often referred to a methylene bridge) or an organic group such as a rosin ester.

Examples of the novolac resins useful herein include, but are not limited to, phenol-formaldehyde, resorcinol-formaldehyde, p-butyl phenol-formaldehyde, p-ethyl phenol-formaldehyde, p-hexyl phenol-formaldehyde, p-propyl phenol-formaldehyde, p-pentyl phenol-formaldehyde, p-octyl phenol-formaldehyde, p-heptyl phenol-formaldehyde, p-nonlyl phenol-formaldehyde, bisphenol-A-formaldehyde, hydroxynaphthaleneformaldehyde and alkyl (such as t-butyl) phenol modified ester (such as pentaerythritol ester) of rosin (particularly partially maleated rosin). The various listed novolacs differ in their R substituted group, melting points, viscosities and other properties.

The preferred novolac resins useful in the present invention include phenol-formaldehyde and alkyl-phenol formaldehyde. Particularly preferred resins include p-octyl phenol formaldehyde such as the thermoplastic novolac resin, AKROCHEM®P-90, p-octyl phenol formaldehyde w/hexamethylenetetramine such as thermoset novaolac resin, AKROCHEM®P-55, and a t-butyl phenol modified pentaerythritol ester of partially maleated rosin such as BECKACITE®126. The most preferred is AKROCHEM®P-90. Commercially available novolac resins are exemplified by those set forth (characterized by their R group and, in the case of BECKICITE®126, the R' group) in Table I. Other than in the case of BECKACITE®126, R' in the commercial novolac resins exemplified is believed to be $CH_2$.

TABLE I

| PHENOLIC RESIN | SUPPLIER |
|---|---|
| P-55 Octyl Phenol w/ hexamethylenetetramine (Thermoset Resin) | Akrochem Corporation |
| P-86 Alkyl Phenol | |
| P-90 Octyl Phenol | |
| P-133 Alkyl Phenol | |
| BECKACITE ® 126 t-butyl phenol modified pentaerythritol ester of partially maleated rosin | Arizona Chemical |
| CRJ 406 O-Cresol Phenol | Schenecktady International |
| HRJ 10424 Phenol | |
| HRJ 2355 Butyl Phenol | |
| CRJ 418 Octyl Phenol | |
| HRJ 10739 Bis Phenol A | |
| SP 25 Alkyl Phenol | |
| HRJ-2190 Alkyl Phenol | |
| HRJ 1166 Alkyl Phenol | |
| FRJ 425 Alkyl Phenol | |
| BPA Bis Phenol A | |
| HRJ 2258 Alkyl Phenol | |

Effective amounts (preferably about 2 to about 50 parts per hundred parts by weight of PVC in the compounded PVC, more preferably about 5 to about 25 parts, and still more preferably about 5 to about 15 parts) of the phenolic resins of the present invention can be blended with ethylene/carbon monoxide copolymer first or they can be blended directly into the PVC compound according to one of the following procedures:

1. The ethylene/carbon monoxide copolymer and the phenolic resins may be blended at a temperature sufficiently high to melt the polymer but low enough to avoid scorching (discoloration) or crosslinking (preferably 100° to 150° C.) to form a homogeneous mixture using any intensive mixing device conventionally used in preparing thermoplastic blends. The PVC and other components typically employed in the compound as discussed above in the "BACKGROUND OF THE INVENTION" can then be mixed at a sufficient temperature, preferably 165° to 195° C., to form a homogeneous mixture. The homogeneous mixture can then be removed from the mixing device and sheeted out on a roll mill, for example, to form a flexible sheet. The sheeting device should be operated at a temperature of about 150° C.
2. The ethylene/carbon monoxide copolymer, the PVC and other components typically employed in the compound as discussed above in the "BACKGROUND OF THE INVENTION" can be melt blended in a mixing device at a sufficient temperature, preferably 165° to 195° C., to form a homogeneous mixture which can be formed into pellets as taught in the art. The resulting PVC Compound and the phenolic resins may then be melt-blended at a temperature sufficiently high to melt the polymer but low enough to avoid scorching, crosslinking or degrading of PVC (preferably 165° to 195° C.) to form a homogeneous mixture using any intensive mixing device conventionally used in preparing thermoplastic blends. The homogeneous mixture can then be removed from the mixing device and sheeted out on a roll mill, for example, to form a flexible sheet. The sheeting device should be operated at a temperature of about 150° C.
3. Obviously, all the components can be added at the same time to the mixing device and blended to a homogeneous mixture to be subsequently sheeted out.

Suitable mixing devices include rubber mills, internal mixers (such as BANBURY® and BRABENDER® mixers), single-or-multiple-blade internal mixers with a cavity heated externally or by friction, KOKNEADER® mixers, multibarrel mixers such as FARRELL® continuous mixers, injection molding machines, and extruders (both single screw and twin screw, both co-rotating and counter-rotating, both intermeshing and non-intermeshing) may be used. These devices can be used alone or in combination with static mixers, mixing torpedoes, and/or various devices to increase internal pressure and/or intensity of mixing such as screws, valves, gates and the like designed for such purpose.

Fillers such as precipitated calcium carbonate, clay, magnesium sulfate, barium sulfate, titanium dioxide, carbon black, various colored pigments and other fillers used in PVC can also be added and, while the reason is not understood, appear (as will be seen in the examples) to have an enhancing effect on the performance of the novolac resin. Better adhesion is achieved at lower loadings per hundred weight of PVC. Preferably, fillers are added at a loading up to about 80 parts per hundred parts by weight (pph) PVC, particularly about 1 to 20 pph PVC. Preferably, the filler is a pigment or a blend of pigments such as exemplified below. Preferable loading of pigments is about 1 to 10 pph PVC.

EXAMPLES

In the following examples, the sample plaques were prepared by sheeting the homogeneous mixture out on a Bolling two-roll (each roll 13 inches long by 6 inches diameter) laboratory roller mill at a temperature of 150° C. and a gap set form a sheet about 0.05-0.10 inches (50-100 mils) thick. The sample plaques were compression molded in a Pasedena Hydraulic, Inc. hydraulic press set at 350° to 365° F. (177° to 185° C.). A 6×6 inch by 40 rail chase was placed on top of a steel plate covered with PTFE film. Pieces of the sheet (sample plaques) were placed in the chase and a second steel plate covered with PTFE film was then placed on top of the chase (the PTFE film on the steel plates contacting the sample plaque). This mold assembly was placed in the press, the sample was touch pressed for about 2 minutes until it flowed, and then 50,000 PSI (344.5 MPa) was applied for about 3-5 minutes. The mold assembly was removed from the press and placed in a second cool press and subjected to a pressure of 50,000 PSI (344.5 MPa). The mold assembly was allowed to cool until cool to the touch (about 60°-70° C.) before removing the sample plaques.

The 6×6-inch sample plaques were placed into a covered 6×6×2-inch metal box (mold) lined with paper and polyethylene film to prevent foam from sticking to the mold. Forty-two (42) grams of Polyol ELASTOFLEX ® R2060U (ethylene oxide/propylene oxide polyol) and 18 grams of MDI ELASTOFLEX® R2500U light (methyl diisocyanate) both available from BASF were mixed together in a high speed mixer operated at 3000 revolutions per minute to form a polyurethane (PU) foam. The resulting PU foam was immediately poured into the mold, the mold was closed, and the foam was allowed to form on the sample plaque at room temperature (about 23° C.) for about 10 minutes. The sample plaque with the PU foam was then removed from the mold and any paper or polyethylene film adhering to the sample were removed.

Adhesion was checked by pulling the foam at right angles to the sample plaque by hand until separation resulted. The adhesive strength was subjectively determined using the following scale:

| RATING | |
|---|---|
| 0 | No adhesion (the surface of the sample and the foam were clean) |
| 1-4 | Some degree of foam tear with some degree of being able to scrape the cohesive foam from the skin |
| 5 | Foam tear and cohesive foam difficult or impossible to scrape from sample |

Example 1

Finely pulverized thermosetting two-step phenolic novolac resin treated with 6.5 to 8.8 wt. % hexamethylenetetramine, having a specific gravity of 1.17 and a capillary tube melting point of 73° C. (available from Akrochem Corporation as AKROCHEM ®P-55) was melt blended with an ethylene copolymer derived from 60 wt. % ethylene, 30 wt. % n-butyl acrylate and 10 wt. % carbon monoxide (available from E. I. du Pont de Nemours and Company as ELVALOY ®HP441) in a BRABENDER ® mixer until homogeneous. PVC Dry Blend (100 parts by weight Geon 30 PVC available from Geon Corporation, 25 parts RX12042 liquid plasticizer (polyesterglutarate di isodecyl adipate) available from C.P. Hall, 0.2 parts OP wax (polyethylene wax) available from Hoechst, 0.6 pans stearic acid (1-heptadecanecarboxylic acid) available from Argus Witco, 5 parts Drapex 6.8 epoxidized soybean oil stabilizer available from Argus Witco, 1.25 parts Mark 6708 (organo barium zinc) stabilizer available from Witco and 1.5 pans Mark 6045 stabilizer (inorganic salt mix) available from Witco) was then added to the BRABENDER ® mixer and shear mixed at a temperature of 175°-180° C. for about 5 minutes to form a homogeneous mixture. Sample plaques were made from the mixture and tested in accord with above procedures. The test rating at a loading of 7 parts AKROCHEM ®P-55 per hundred parts (by weight) PVC was 5.

Example 2

The PVC Dry Blend of Example 1 was melt blended to a homogeneous mixture with 39 parts ELVALOY ®HP 441, 70 pans TYRIL ®880B (styrene acrylonitrile resin reinforcing agent) available from Dow Chemical Co., 10 parts PARALOID ®KM 335 (acrylic p(butyl acrylate/methyl methacrylate) impact modifier) available from Rohm and Haas Corporation, 0.112 parts IRGONOX ®1010 (benzenepropanic acid hindered phenol) antioxidant available from Ciba Geigy, and 0.45 parts SEENOX ®412X (thioester) antioxidant) per hundred parts (by weight) PVC to produce a standard flexible PVC compound plasticized with an ethylene/carbon monoxide copolymer (PVC Test Compound) and pelletized.

The PVC Test Compound was melted and sheared into a smooth homogeneous mixture and phenolic resin flakes were melt blended at 160° C. into PVC Test Compound at the levels (pans per hundred based on weight of PVC) shown in the following tables. Sample plaques were made and tested in accord with the above procedure. Test results (Bond strength, subjectively determined by the amount and thickness of PU remaining after the materials were pulled apart and the difficulty in scraping the adhered PU from the plaque) for the specific Phenolic Resins are presented in the Tables II, III and IV.

In Table IV, some of the phenolic resins (designated as "gray compound") were made by blending the particular resin with the following pigments obtained from Teknor Apex:

| Pigment | Loading (pph PVC) |
|---|---|
| LSR 6099 Red | 0.154 |
| LSY 6104 Yellow | 0.467 |
| LSB 6209 Blue | 0.056 |
| LSW 6144 White | 0.863 |
| LSK 6138 Black | 0.999 |

TABLE II

| P-55 (pph) | 1.76 | 7.06 | 23.65 |
|---|---|---|---|
| Test Results | 0 | 4 | 5 |

TABLE III

| P-90 (pph) | 2.86 | 8.0 | 16.07 | 32.14 | 47.13 |
|---|---|---|---|---|---|
| Test Results | 0 | 5 | 5 | 5 | 5 |

TABLE IV

| | Test Results (7.79-8.0 pph resin) | Test Results** (47.13 pph resin) |
|---|---|---|
| P-133 | 0/0* | 5 |
| Beckacite ® 126 | 0/5* | 5 |
| HRJ 10424 | 0/5* | 5 |
| HRJ 10739 | 0/5* | 5 |
| HRJ 1166 | 0/—* | 5 |

TABLE IV-continued

| | Test Results (7.79–8.0 pph resin) | Test Results** (47.13 pph resin) |
|---|---|---|
| P-55 | —/5* | — |
| P-90 | —/5* | 5 |

*The first test result is that for resin without pigment and the second value is that for gray compound. A dash (—) indicates that test was not conducted.
**Resins at a loading of 47.13 pph were all without pigment.

I claim:

1. An improved polyvinyl chloride (PVC) sheet plasticized with ethylene/carbon monoxide copolymer, the improvement which comprises including an effective amount of a novolac resin to promote adhesion of polyurethane to the sheet, the novolac resin represented by the general polymer formula:

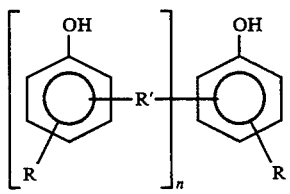

wherein n is an integer from 1 to 1000 and each R is selected from the group consisting of hydrogen; halogens; $C_1$-$C_{16}$ alkyl group, $C_6$-$C_{18}$ aryl group, and $C_7$-$C_{20}$ arylalkyl radical, any of which may be substituted with a $C_1$-$C_{12}$ alkyl group or a halogen atom; or a hydroxy aryl or alkyl hydroxy aryl radical and wherein R' is selected from $CH_2$ or a rosin ester.

2. The PVC sheet of claim 1 wherein the novolac resin is selected from the group consisting of phenol-formaldehyde, resorcinol-formaldehyde, p-butyl phenol-formaldehyde, p-ethyl phenol-formaldehyde, p-hexyl phenol-formaldehyde, p-propyl phenol-formaldehyde, p-pentyl phenol-formaldehyde, p-octyl phenol-formaldehyde, p-heptyl phenol-formaldehyde, p-nonlyl phenol-formaldehyde, bisphenol-A-formaldehyde, hydroxynaphthaleneformaldehyde and alkyl phenol modified ester of rosin.

3. The PVC sheet of claim 2 wherein the novolac resin is selected from group consisting of p-octyl phenol formaldehyde, p-octyl phenol formaldehyde w/hexamethylenetetramine, and t-butyl phenol modified pentaerythritol ester of partially maleated rosin.

4. The PVC sheet of claim 3 wherein the novolac resin is p-octyl phenol formaldehyde.

5. The PVC sheet of claim 1 wherein the novolac resin is present at a loading of about 2 to about 50 parts per hundred parts by weight (pph) PVC.

6. The PVC sheet of claim 5 wherein the novolac resin is present at a loading of about 5 to about 25 pph PVC.

7. The PVC sheet of claim 6 wherein the novolac resin is present at a loading of 5 to 15 pph PVC.

8. The PVC sheet of claim 1 further containing one or more fillers.

9. The PVC sheet of claim 8 wherein the filler is present at a loading of about 1 to about 80 pph PVC.

10. A polyurethane foam article clad with the improved PVC sheet of claim 1.

11. A polyurethane foam article clad with the improved PVC sheet of claim 2.

12. A polyurethane foam article clad with the improved PVC sheet of claim 3.

13. A polyurethane foam article clad with the improved PVC sheet of claim 4.

14. A polyurethane foam article clad with the improved PVC sheet of claim 5.

15. A polyurethane foam article clad with the improved PVC sheet of claim 8.

16. A process for promoting the adhesion of polyurethane (PU foam) to PVC sheet plasticized with an ethylene/carbon monoxide copolymer comprising melt blending an effective amount of a novolac resin into the plasticized PVC used to manufacture the PVC sheet.

17. The process of claim 16, wherein the novolac resin is blended with the ethylene/carbon monoxide copolymer plasticizer before the plasticizer is melt blended with the PVC.

* * * * *